(12) United States Patent
Schumann

(10) Patent No.: US 10,190,651 B2
(45) Date of Patent: Jan. 29, 2019

(54) MULTI-STAGE DAMPING ASSEMBLY

(71) Applicant: BeijingWest Industries Co., Ltd., Beijing (CN)

(72) Inventor: Eric Louis Schumann, Tipp City, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 15/588,573

(22) Filed: May 5, 2017

(65) Prior Publication Data

US 2017/0363173 A1    Dec. 21, 2017

Related U.S. Application Data

(60) Provisional application No. 62/350,736, filed on Jun. 16, 2016.

(51) Int. Cl.
*F16F 13/18* (2006.01)
*F16F 13/10* (2006.01)
*F16F 13/26* (2006.01)

(52) U.S. Cl.
CPC .......... *F16F 13/106* (2013.01); *F16F 13/264* (2013.01); *F16F 13/268* (2013.01); *F16F 2224/025* (2013.01); *F16F 2224/0283* (2013.01); *F16F 2230/18* (2013.01)

(58) Field of Classification Search
CPC .......... F16F 13/20; F16F 13/106; F16F 13/18; F16F 13/26
USPC ................. 267/140.11–140.15, 140.2–140.5, 267/141.1–141.7
See application file for complete search history.

(56) References Cited

U.S. PATENT DOCUMENTS 4,742,999 A    5/1988   Flower
5,167,403 A   12/1992   Muramatsu
(Continued)

FOREIGN PATENT DOCUMENTS

CN    101784815 A    7/2010
EP     0556704       2/1993
(Continued)

OTHER PUBLICATIONS

European Search Report dated Feb. 12, 2018 (11 pages).
(Continued)

*Primary Examiner* — Christopher P Schwartz
(74) *Attorney, Agent, or Firm* — William H. Honaker; Dickinson Wright PLLC

(57) ABSTRACT

An assembly for multi-stage damping comprising a damping unit 20 including a decoupler 36 defining an annular zone 70 surrounding a circular zone 68. The annular zone 70 extends inwardly from an outer ring 38 to define a ring shape for flexing with the circular zone 68 in a first mode 72 to maximize the potential volume of displacement between a first chamber 30 and a second chamber 32. Additionally, the assembly provides for flexing the annular zone 70 independently of the circular zone 68 in a second mode 74 to decrease the potential volume of displacement of the decoupler 36 between the first chamber 30 and the second chamber 32. The decoupler 36 includes a plurality of rings 38, 46, 54 extending axially from a first surface 40 and a second surface 42 for defining an axial travel limit for the annular zone 70.

20 Claims, 5 Drawing Sheets

(56) References Cited

U.S. PATENT DOCUMENTS

| | | | | |
|---|---|---|---|---|
| 6,010,120 A * | 1/2000 | Nagasawa | ............... | F16F 13/20 |
| | | | | 267/140.12 |
| 6,439,556 B1 * | 8/2002 | Baudendistel | ........ | F16F 13/106 |
| | | | | 267/140.15 |
| 6,612,554 B1 * | 9/2003 | Linn | ..................... | F16F 13/105 |
| | | | | 267/140.13 |
| 2006/0071381 A1 * | 4/2006 | Hatakeyama | ......... | F16F 13/106 |
| | | | | 267/140.13 |
| 2012/0299229 A1 * | 11/2012 | Kubo | .................... | F16F 13/106 |
| | | | | 267/140.13 |
| 2015/0316121 A1 * | 11/2015 | Kadowaki | ............ | F16F 13/106 |
| | | | | 267/140.13 |

FOREIGN PATENT DOCUMENTS

| | | |
|---|---|---|
| EP | 0851146 A1 | 7/1998 |
| EP | 1081409 | 3/2001 |
| EP | 1306575 A2 | 5/2003 |
| JP | 2005133846 | 10/2003 |
| JP | 4256246 B2 | 6/2009 |

OTHER PUBLICATIONS

First Office Action issued for corresponding Japanese Patent Application 2017-117774 dated Apr. 24, 2018.
First Office Action and Search Report dated Aug. 30, 2018 for counterpart Chinese patent application No. 201710342613.7.

\* cited by examiner

MULTI-STAGE DAMPING ASSEMBLY

RELATED APPLICATIONS

This application claims the benefit of U.S. Provisional Application No. 62/350,736 filed on Jun. 16, 2016.

STATEMENT REGARDING FEDERALLY SPONSORED RESEARCH

None.

TECHNICAL FIELD

An assembly for multi-stage damping useful for isolating vibrational forces.

BACKGROUND OF THE INVENTION

Damping assemblies of the type to which the subject invention pertains are used for isolating vibrational forces and are particularly useful in automobiles which are often subject to an array of vibrational loads. Such an assembly is illustrated in U.S. Pat. No. 6,439,556 to Baudendistel et al., wherein the assembly includes a damping unit having a wall of generally cylindrical shape that defines an inner surface and an outer surface extending about an axis between a base portion and a top portion. A partition is spaced along the axis between the base portion and the top portion and extends from the inner surface of the wall to define a first chamber between the partition and the top portion and a second chamber between the partition and the base portion. The partition has an internal holding wall that defines a holding chamber. A decoupler of a disk shape is disposed within the holding chamber and has a radius extending between a center point and an outer ring engaging the holding wall and having a first surface opposite a second surface for preventing fluid transfer between the chambers. The decoupler defines a circular zone that extends about the center point for flexing between the chambers.

SUMMARY OF THE INVENTION

The invention provides a damping assembly including a decoupler defining an annular zone surrounding a circular zone. The annular zone extends inwardly from an outer ring to define a ring shape for flexing with the circular zone in a first mode to maximize the potential volume of displacement. Additionally, the assembly provides for flexing the annular zone independently of the circular zone in a second mode to decrease the potential volume of displacement of the decoupler between a first chamber and a second chamber. The invention provides for increased tuning with a damping assembly. The circular zone and annular zone can be independently utilized to facilitate different damping characteristics in response to different vibrational loads.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF PREFERRED EMBODIMENTS

Figure 1:
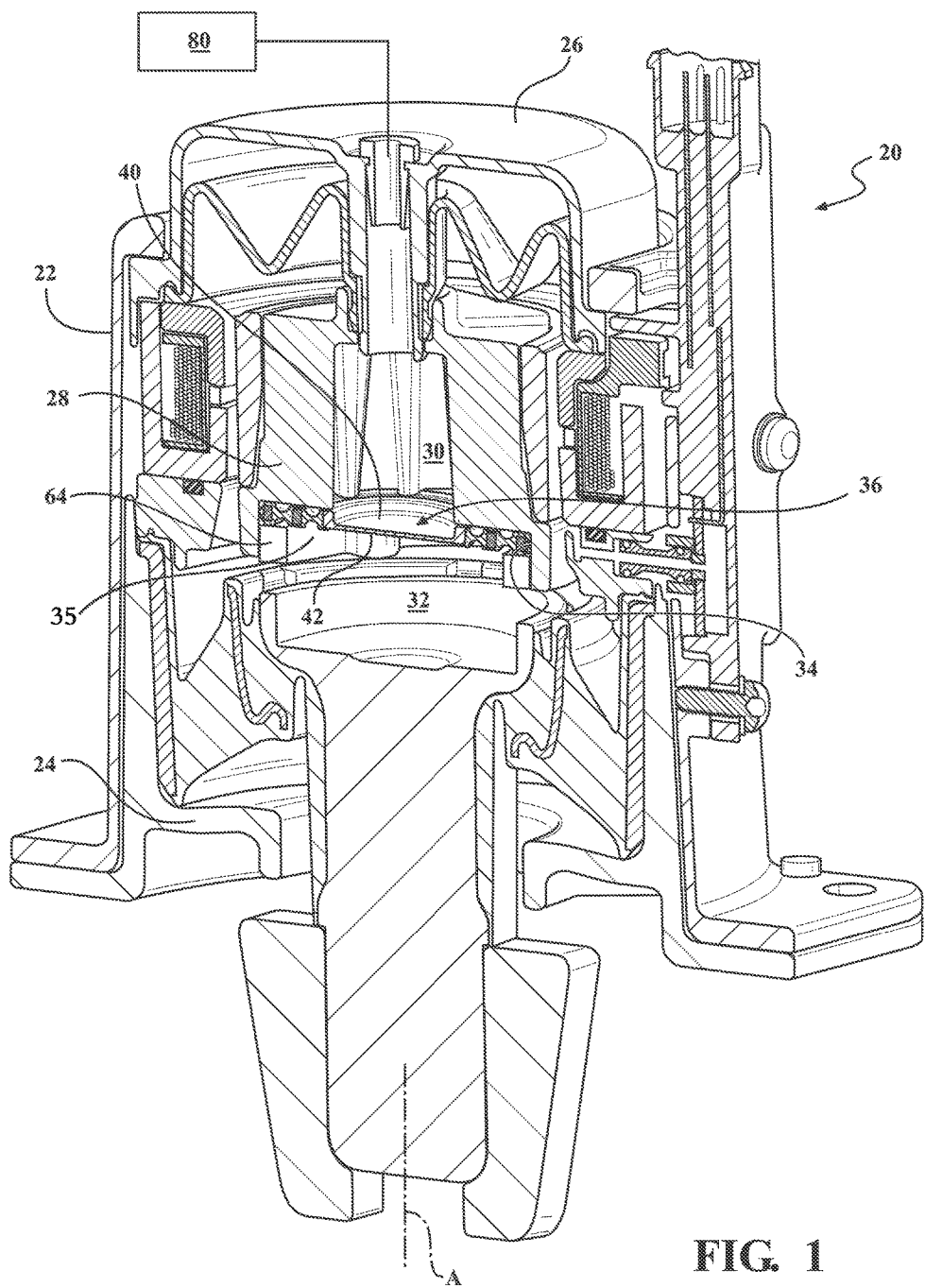
FIG. 1 is a cross-sectional view of the damping unit according to the present invention.

Referring to the Figures, wherein like numerals indicate corresponding parts throughout the several views, an assembly for multi-stage damping constructed in accordance with the subject invention is generally shown in FIG. 1.

The assembly includes a damping unit 20, generally indicated in FIG. 1, having a wall 22 of generally cylindrical shape that defines an inner surface and an outer surface extending about an axis A between a base portion 24 and a top portion 26. A partition 28 is spaced along the axis A between the base portion 24 and the top portion 26 and extends from the inner surface of the wall 22 defining a first chamber 30 between the partition 28 and the top portion 26 and a second chamber 32 between the partition 28 and the base portion 24. In one particular embodiment, the first chamber 30 can be open to the atmosphere. The partition 28 has an internal holding wall 34 that extends circumferentially about the axis A to define a holding chamber 35 within the partition 28. In other embodiments, the partition 28 can be offset from the axis A and define chambers 30, 32 anywhere within the damping unit 20.

Figure 2:
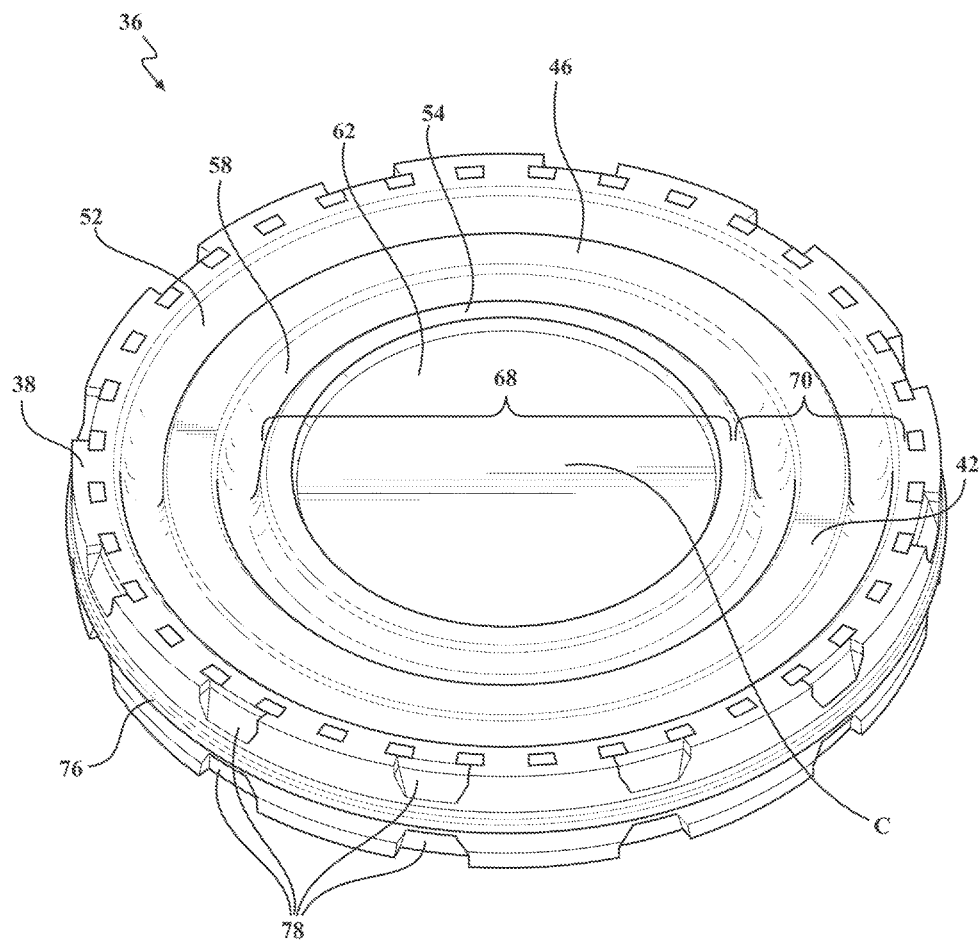
FIG. 2 is a perspective view of a decoupler according to the present invention.
Figure 3:
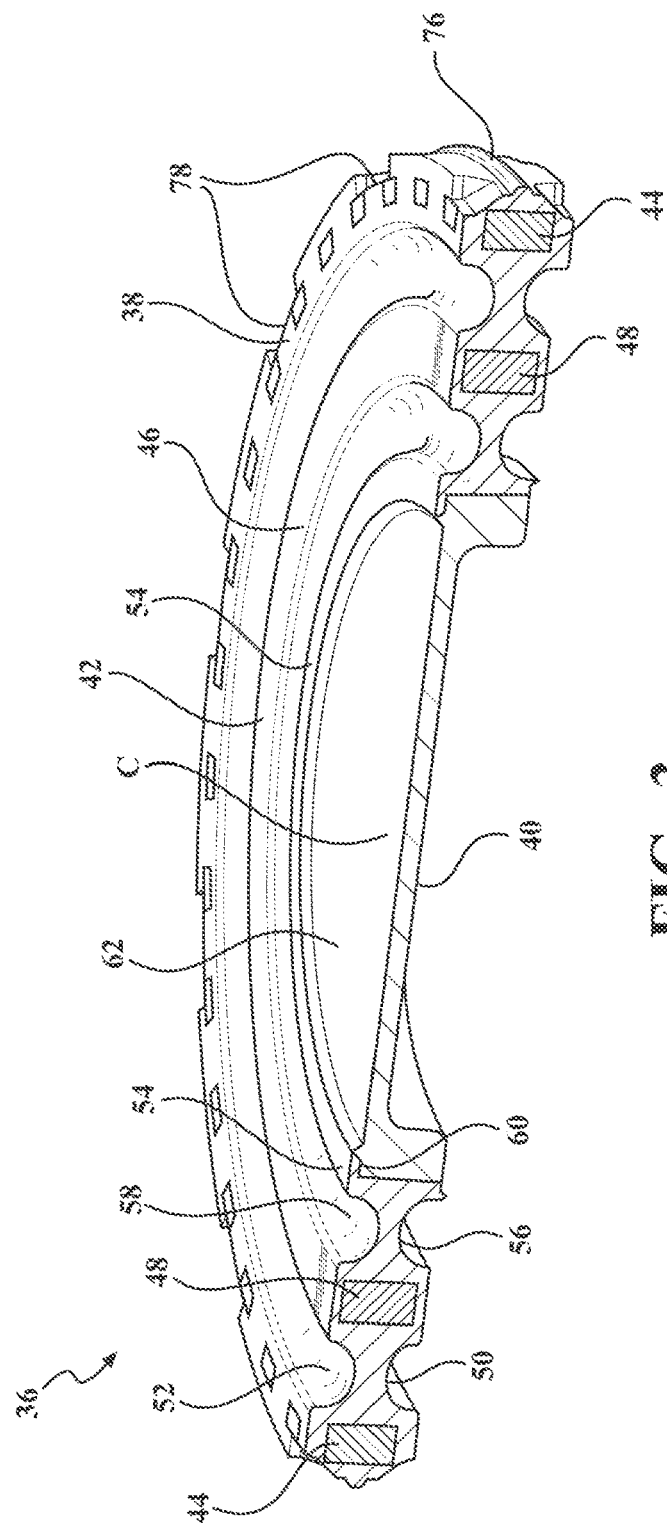
FIG. 3 is a cross-sectional view of the decoupler of FIG. 2.

A decoupler 36, generally indicated in FIG. 2 and FIG. 3, has a disk shape and is disposed within the holding chamber 35. The decoupler 36 has a radius that extends between a center point C and an outer ring 38. The outer ring 38 engages the internal holding wall 34. The decoupler 36 has a first surface 40 in fluid contact with the first chamber 30 opposite a second surface 42 in fluid contact with the second chamber 32 for preventing fluid transfer between the chambers (30, 32). In operation, the assembly allows elastic displacement of the decoupler 36 in response to damping forces applied along the axis A by changing the volume of each of the chambers 30, 32. In other embodiments, the damping forces are not required to be along the axis A, ultimately the decoupler 36 responds to the changing pressure in either chamber 30, 32.

The outer ring 38 of the decoupler 36 has an annular shape and extends axially from the first surface 40 and extends axially from the second surface 42 of the decoupler 36. The outer ring 38 houses a first internal band 44 that has an annular shape and extends along and inside of the outer ring 38 for providing axial and radial support to the decoupler 36.

An intermediate ring 46 extends annularly between the outer ring 38 and the center point C and extends axially from the first surface 40 and extends axially from the second surface 42. The intermediate ring 46 houses a second internal band 48 that has an annular shape and extends along and inside of the intermediate ring 46 for providing axial and radial support to the decoupler 36.

The intermediate ring 46 and the outer ring 38 define a first groove 50 therebetween on the first surface 40. The intermediate ring 46 and the outer ring 38 further define a second groove 52 therebetween on the second surface 42.

The first groove 50 and the second groove 52 each have a semi-circular cross section and add flexibility to the decoupler 36.

An interior ring 54 extends annularly between the intermediate ring 46 and the center point C and extends axially from the first surface 40 and extends axially the second surface 42. The interior ring 54 and the intermediate ring 46 define a third groove 56 therebetween on the first surface 40 and a fourth groove 58 therebetween on the second surface 42. The third groove 56 and the fourth groove 58 both have a semi-circular cross section for adding flexibility to the decoupler 36. A lip 60 extends along the interior ring 54 towards the center point C from the second surface 42. A central elastomer membrane 62 extends from the interior ring 54 and the lip 60 to the center point C. The damping unit 20 further includes a retainer 64 that has an annular shape and secures the decoupler 36 in the holding chamber 35. The retainer 64 has a plurality of arms 66 extending from the retainer 64 towards the axis A.

Figure 4:
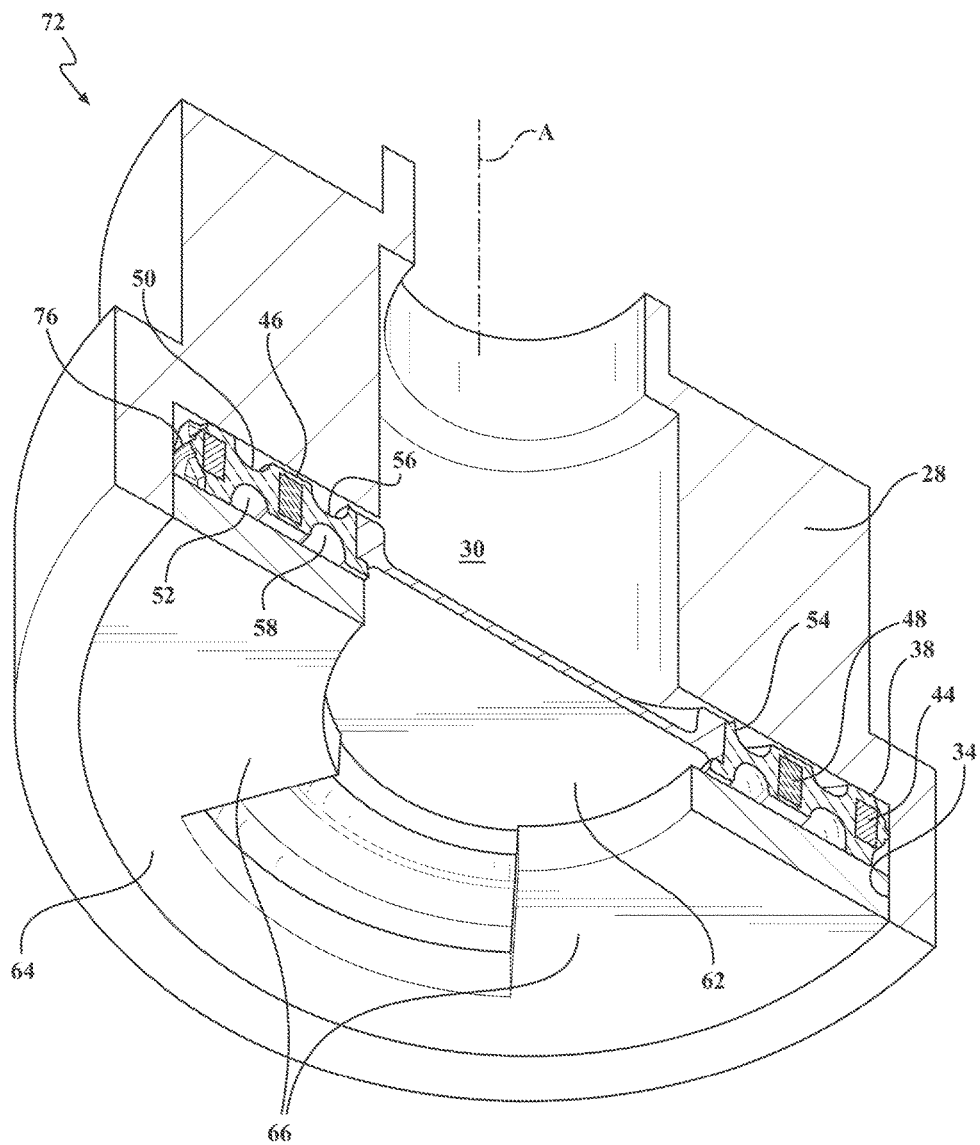
FIG. 4 is a cross-sectional view of a partition with the decoupler in a first mode according to the present invention.
Figure 5:
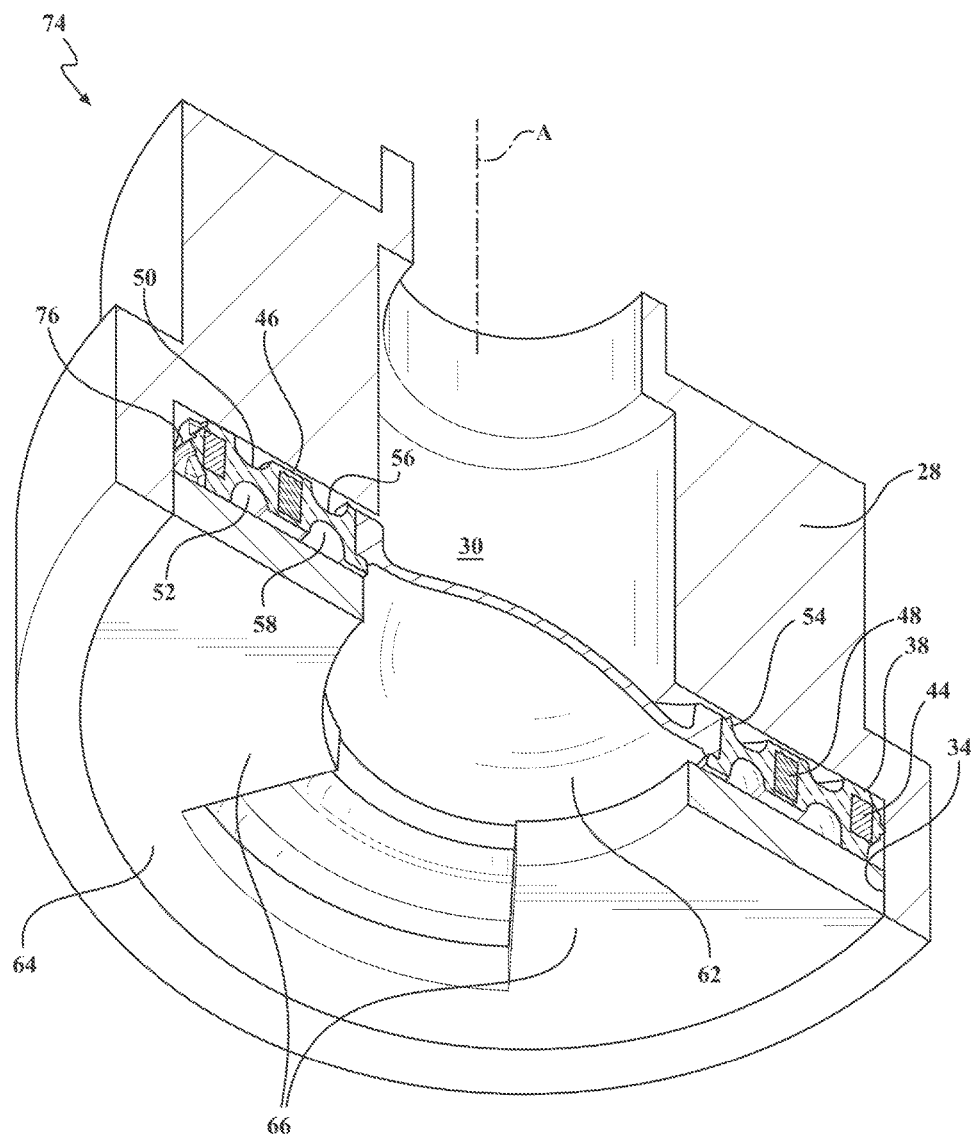
FIG. 5 is a cross-sectional view of the partition with the decoupler in a second mode according to the present invention.

The decoupler 36 defines a circular zone 68 extending about the center point C to the interior ring 54 for flexing between the chambers 30, 32. The decoupler 36 further defines an annular zone 70 surrounding the circular zone 68 that extends inwardly from the outer ring 38 to define a ring shape. The annular zone 70 flexes along with the circular zone 68 in a first mode 72, illustrated in FIG. 4, to maximize the potential volume of displacement, by allowing displacement of both the annular zone 70 and the circular zone 68 simultaneously. Alternatively, the annular zone 70 can flex independently of the circular zone 68 in a second mode 74, illustrated in FIG. 5, for decreasing the potential volume of displacement of the decoupler 36 between the first chamber 30 and the second chamber 32 to only the annular zone 70. It should be appreciated that the circular zone 68 and the annular zone 70 can be comprised all of one material but alternatively can be comprised of different materials having different levels of rigidity based on the users preferred level of tuning.

The outer ring 38 of the decoupler 36 includes a seal bead 76 that extends along the outer ring 38 between the first surface 40 and the second surface 42 for preventing fluid transfer between the first chamber 30 and the second chamber 32. The outer ring 38 further defines a plurality of equidistantly spaced bevels 78 along the first surface 40 and the second surface 42 on either side of the seal bead 76 for providing flexibility to the outer ring 38.

In a preferred embodiment, the arms 66 of the retainer 64 each have a trapezoidal shape and taper towards the axis A terminating at and extending along the interior ring 54.

The outer ring 38 of the decoupler 36 extends axially from the first surface 40 and extends axially from the second surface 42 a greater axial distance than the intermediate ring 46 extends axially and the interior ring 54 extends axially. The greater axial extension spaces the partition 28 from the intermediate ring 46 and the interior ring 54 and defines an axial travel limit of the annular zone 70. Additionally, the interior ring 54 can extend axially from the first surface 40 and extend axially from the second surface 42 a greater axial distance than the intermediate ring 46 extends axially.

In one embodiment, a vacuum source 80 is in fluid communication with the first chamber 30 for depressurizing the first chamber 30 and pulling and keeping the circular zone 68 into the first chamber 30 and pressing the interior ring 54 against the partition 28 in the second mode 74. While the interior ring 54 is pressed against the partition 28 the potential volume of displacement is decreased to only the annular zone 70 between the outer ring 38 and the interior ring 54, with the intermediate ring 46 acting as an axial travel stop.

The decoupler 36 can be switched between the first mode 72 and the second mode 74 by restraining the circular zone 68 with electric, magnetic, or mechanical forces. For example, the circular zone 68 can comprise electroactive polymer and be in electronic communication with a controller for providing current to the circular zone 68 making it rigid. Likewise, the circular zone 68 could house magnetic inserts in magnetic communication with a magnetic source for selectively pulling and holding the circular zone 68 into one of the chambers 30, 32. In yet another embodiment, a restraining piece could be in selective mechanical communication with the circular zone 68 for either pushing and holding the circular zone 68 at maximum displacement or preventing displacement altogether.

In operation, the assembly provides a high level of tuning for end users, particularly users of automobiles. Tuning can be achieved by changing the distance of axial extension of each of the rings 38, 46, 54, by changing the size of the circular zone 68 or the annular zone 70, or by choosing materials having different stiffness characteristics in one or both of the circular zone 68 and the annular zone 70. Providing multi-stage damping with such a high level of tuning between modes 72, 74 creates a broad spectrum of applicability for vibrational damping, from idle vibrations to high amplitude vibrations which can occur while an automobile is traveling at high speeds.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An assembly for multi-stage damping comprising;
   a damping unit (20) including a wall (22) defining an inner surface and an outer surface extending about an axis (A) between a base portion (24) and a top portion (26);
   a partition (28) spaced between said base portion (24) and said top portion (26) and extending from said inner surface of said wall (22) defining a first chamber (30) between said partition (28) and said top portion (26) and a second chamber (32) between said partition (28) and said base portion (24), said partition (28) having an internal holding wall (34) defining a holding chamber (35);
   a decoupler (36) is disposed within said holding chamber (35) and has a radius extending between a center point (C) and an outer ring (38), said outer ring (38) engaging said internal holding wall (34), said decoupler (36) having a first surface (40) opposite a second surface (42) for preventing fluid transfer between said chambers (30, 32);
   said decoupler (36) defining a circular zone (68) extending about said center point (C) for flexing between said chambers (30, 32); and
   said decoupler (36) defining an annular zone (70) surrounding said circular zone (68) extending inwardly from said outer ring (38) to define a ring shape whereby said annular zone (70) flexes between a first mode and a second mode with said first mode being defined as said annular zone (70) flexing with said circular zone (68) to maximize the potential volume of displacement and said second mode being defined as said annular zone (70) flexing independently of said circular zone (68) to decrease the potential volume of displacement of said decoupler (36) between said first chamber (30) and said second chamber (32).

2. An assembly as set forth in claim 1 wherein said decoupler (36) includes an interior ring (54) spaced between said outer ring (38) and said circular zone (68) and said interior ring (54) extends annularly about said center point (C) and extends axially from said first surface (40) and extends axially from said second surface (42).

3. An assembly as set forth in claim 2 wherein said outer ring (38) extends axially from said first surface (40) and extends axially from said second surface (42) a greater axial distance than said interior ring (54) extends axially for spacing said partition (28) from said interior ring (54) to define an axial travel limit of said interior ring (54).

4. An assembly as set forth in claim 3 wherein said decoupler (36) includes an intermediate ring (46) spaced between said outer ring (38) and said interior ring (54) and said intermediate ring (46) extends annularly about said center point (C) and extends axially from said first surface (40) and extends axially from said second surface (42).

5. An assembly as set forth in claim 4 wherein said interior ring (54) extends axially from said first surface (40) and extends axially from said second surface (42) a greater axial distance than said intermediate ring (46) extends axially.

6. An assembly as set forth in claim 5 wherein said intermediate ring (46) and said outer ring (38) define a first groove (50) therebetween on said first surface (40) and a second groove (52) therebetween on said second surface (42) with each of said first groove (50) and said second groove (52) having a semi-circular cross section for adding flexibility to said annular zone (70).

7. An assembly as set forth in claim 6 wherein said interior ring (54) and said intermediate ring (46) define a third groove (56) therebetween on said first surface (40) and a fourth groove (58) therebetween on said second surface (42) with each of said third groove (56) and said fourth groove (58) having a semi-circular cross section for adding flexibility to said annular zone (70).

8. An assembly as set forth in claim 7 including a vacuum source (80) in fluid communication with said first chamber (30) for depressurizing said first chamber (30) in said second mode (74) and pulling and keeping said circular zone (68) into said first chamber (30) at maximum displacement and pressing said interior ring (54) against said partition (28) to decrease the potential volume of displacement to said annular zone (70) between said outer ring (38) and said interior ring (54).

9. An assembly as set forth in claim 3 including a retainer (64) having an annular shape for securing said decoupler (36) in said holding chamber.

10. An assembly as set forth in claim 9 wherein said retainer (64) includes a plurality of arms (66) extending towards said axis (A) terminating at and extending along said interior ring (54) to define an axial travel limit of said interior ring (54) of said annular zone (70) along said axis (A) towards said second chamber (32).

11. An assembly for multi-stage damping comprising;
a decoupler (36) having a radius extending between a center point (C) and an outer ring (38) and having a first surface (40) opposite a second surface (42),
a central elastomer membrane (62) extending about said center point (C),
said decoupler (36) defining a circular zone (68) extending about said center point (C) and an annular zone (70) including a plurality of rings (38, 46, 54) extending axially from said first surface (40) and extending axially from said second surface (42) and extending annularly about said central elastomer membrane (62) and separated by grooves (50, 52, 56, 58) in said first surface (40) and said second surface (42) between said outer ring (38) and said central elastomer membrane (62), and
wherein said annular zone (70) flexes between a first mode and a second mode with said first mode being defined as said annular zone (70) flexing with said circular zone (68) to maximize the potential volume of displacement and said second mode being defined as said annular zone (70) flexing independently of said circular zone (68) to decrease the potential volume of displacement of said decoupler (36) between said first chamber (30) and said second chamber (32).

12. An assembly as set forth in claim 11 wherein said plurality of rings (38, 46, 54) includes an interior ring (54) spaced between said outer ring (38) and said central elastomer membrane (62) and said interior ring (54) extends annularly about said center point (C) and extends axially from said first surface (40) and extends axially from said second surface (42).

13. An assembly as set forth in claim 12 wherein said outer ring (38) extends axially from said first surface (40) and extends axially from said second surface (42) a greater axial distance than said interior ring (54).

14. An assembly as set forth in claim 13 wherein said plurality of rings (38, 46, 54) includes an intermediate ring (46) spaced between said outer ring (38) and said interior ring (54) and said intermediate ring (46) extends annularly about said center point (C) and extends axially from said first surface (40) and extends axially from said second surface (42).

15. An assembly as set forth in claim 14 wherein said interior ring (54) extends axially from said first surface (40) and extends axially from said second surface (42) a greater axial distance than said intermediate ring (46).

16. An assembly as set forth in claim 15 wherein said interior ring (54) includes a lip (60) extending along said interior ring (54) towards said center point (C) from said second surface (42) for attachment to said central elastomer membrane (62).

17. An assembly as set forth in claim 16 wherein said outer ring (38) houses a first internal band (44) having an annular shape and extending along and inside of said outer ring (38) for providing axial and radial support to said decoupler (36).

18. An assembly as set forth in claim 17 wherein said intermediate ring (46) houses a second internal band (48) having an annular shape and extending along and inside of said intermediate ring (46) for providing axial and radial support to said decoupler (36).

19. An assembly as set forth in claim 11 wherein a seal bead (76) extends along said outer ring (38) between said first surface (40) and said second surface (42) for preventing fluid transfer between chambers (30, 32).

20. An assembly as set forth in claim 19 wherein said outer ring (38) defines a plurality of equidistantly spaced bevels (78) along said first surface (40) and said second surface (42) on either side of said seal bead (76) for providing flexibility to said outer ring (38).

\* \* \* \* \*